（12）United States Patent
Torris et al.

(10) Patent No.: US 8,561,281 B2
(45) Date of Patent: Oct. 22, 2013

(54) STACKED FAMILY MOLDING AND SUBSEQUENT ASSEMBLY PROCESS

(75) Inventors: William Torris, Greer, SC (US); Glynn Clements, Greenville, SC (US); Lynn Howe, McVeytown, PA (US)

(73) Assignee: Alltrista Plastics, LLC, Greer, SC (US)

( * ) Notice: Subject to any disclaimer, the term of this patent is extended or adjusted under 35 U.S.C. 154(b) by 307 days.

(21) Appl. No.: 13/089,897

(22) Filed: Apr. 19, 2011

(65) Prior Publication Data

US 2011/0192524 A1     Aug. 11, 2011

Related U.S. Application Data

(62) Division of application No. 11/695,868, filed on Apr. 3, 2007, now Pat. No. 7,950,127, which is a division of application No. 10/769,310, filed on Jan. 30, 2004, now Pat. No. 7,214,286.

(51) Int. Cl.
*B21D 39/02*     (2006.01)

(52) U.S. Cl.
USPC .................................. 29/463; 29/429; 29/467

(58) Field of Classification Search
USPC ........... 29/463, 429, 430, 431, 464, 467, 468, 29/771, 777, 799, 801, 238, 281.5, 283
See application file for complete search history.

(56) References Cited

U.S. PATENT DOCUMENTS

| 3,336,654 | A | * | 8/1967 | Ryan | 29/429 |
| 3,457,627 | A | * | 7/1969 | Engel et al. | 29/430 |
| 3,968,560 | A | * | 7/1976 | Vial | 29/430 |
| 4,127,925 | A | * | 12/1978 | Gaiser et al. | 29/430 |
| 4,656,717 | A | * | 4/1987 | MacLeod, Jr. | 29/430 |
| 5,467,517 | A | * | 11/1995 | Sugito et al. | 29/407.05 |
| 6,279,220 | B1 | * | 8/2001 | Esaki | 29/430 |
| 6,360,417 | B1 | * | 3/2002 | Jack et al. | 29/430 |
| 6,463,719 | B2 | * | 10/2002 | Dey et al. | 53/430 |
| 6,591,489 | B2 | * | 7/2003 | Shimizu et al. | 29/806 |
| 2002/0104210 | A1 | * | 8/2002 | Buck | 29/430 |
| 2003/0101579 | A1 | * | 6/2003 | Murakami et al. | 29/783 |

* cited by examiner

*Primary Examiner* — David Bryant
*Assistant Examiner* — Christopher Koehler
(74) *Attorney, Agent, or Firm* — Michael J. Corrigan

(57) ABSTRACT

The subject invention relates to a precision injection molding of multi-piece parts and the subsequent handling and assembly of those parts produced from the mold. In an exemplary embodiment, a surgical suture package with a top part and a bottom part is molded and assembled. In such a method and system, the top parts and bottom parts are first molded utilizing a family mold and then are transferred to a stacker. The stacker is able to stack the top part and bottom part on top of one another on a pallet. The parts are then transported to a welder in order to weld the top part and bottom part together. The completed surgical suture packages are then transferred to a magazine for storage and shippage.

15 Claims, 14 Drawing Sheets

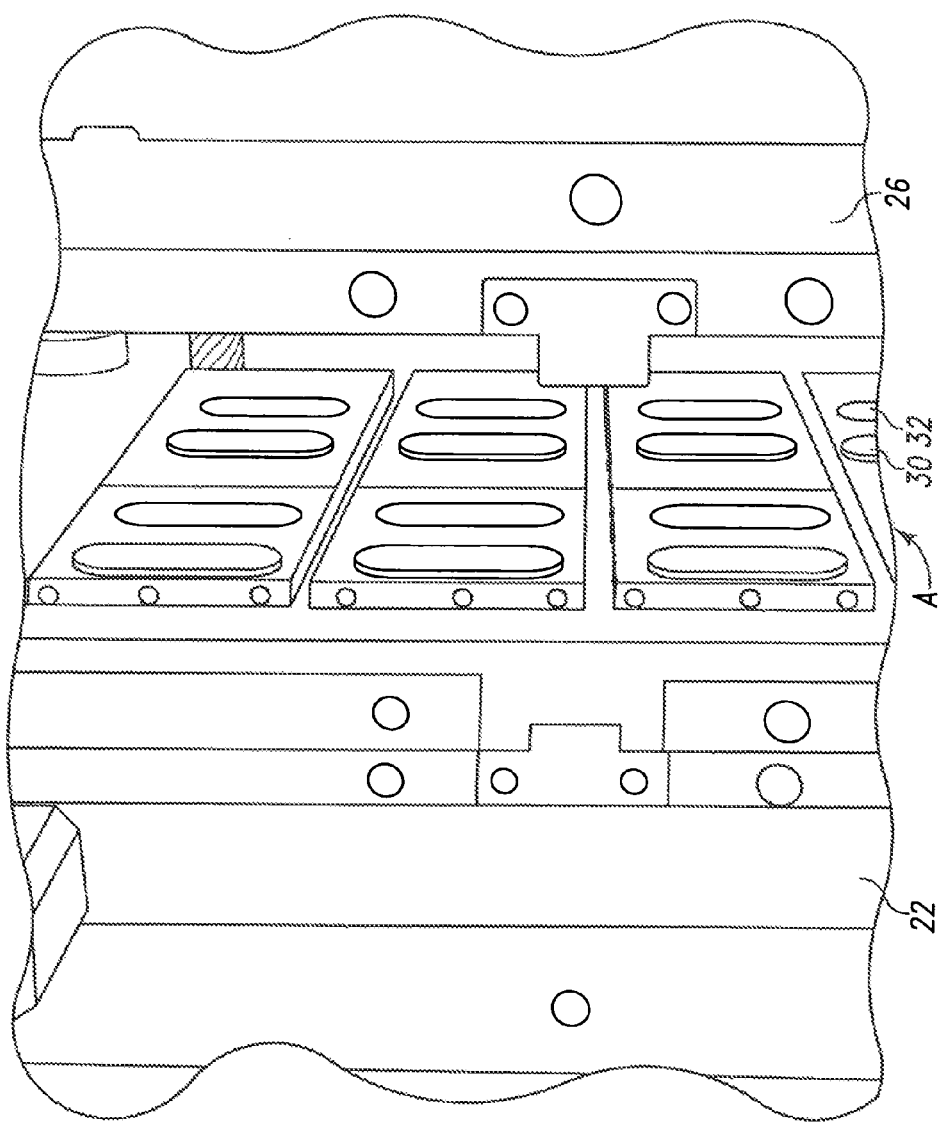

STACKED FAMILY MOLDING AND SUBSEQUENT ASSEMBLY PROCESS

RELATED APPLICATIONS

This application is a divisional application of U.S. Nonprovisional patent application Ser. No. 11/695,868 filed on Apr. 3, 2007, now U.S. Pat. No. 7,950,127 which is hereby incorporated by reference in its entirety, and which is a divisional application of U.S. Nonprovisional patent application Ser. No. 10/769,3103, filed on Jan. 30, 2004, now U.S. Pat. No. 7,214.286.

BACKGROUND OF INVENTION

The subject invention relates to injection molding machines that are able to mold at least two separate distinct parts at the same time and relates, in particular, to methods and systems for retrieving and assembling the at least two molded parts into a completed product. The use of family molds have become common in the production of plastic parts. A family mold is a mold that forms at least two separate, distinct parts that are to be joined together to form a single product. However, a need still exists for an efficient and cost-effective process for removing the molded parts from mold and assembling them into a finished product.

A variety of mechanisms have been used to remove the molded parts from the family mold, For example, in U.S. Pat. No. 4,915,611, a receiver is used to transfer the molded parts to a container. A family mold is used to produce a number of molded articles. The receiver, having individual article receptors, mates with the molded articles in order to remove the articles from the mold and transfer the molded articles from the mold to a container. U.S. Pat. No. 4,976,603 also discloses a device for removing molded pieces from a stacked mold. A rotatable arm assembly with a suction cup is utilized to remove the molded pieces from the stacked mold. As the mold portions are moved from close to open, the at least one suction cup engages the molded pieces and rotates through a ninety degree arc. The suction cup then releases the work piece so that the molded work piece is dropped down a chute to a conveyor belt.

While these patents disclose methods for removing molded parts from a family mold, these patents do not disclose a method for not only molding and removing the parts from the mold stack, but also assembling the separate, distinct parts into a product and then transferring the product to a magazine and/or container for storage. By utilizing an automated process that not only molds the parts but also removes and assembles the parts, the subject invention is able to cut down on the manufacturing cost associated with molding and assembling multi-piece parts. This and further advantages will become more apparent from the following description and drawings.

BRIEF INVENTION SUMMARY

The subject invention relates to the field of injection molding. More particularly, the subject invention relates to precision and injection molding of multi-piece parts and the subsequent handling and assembly of the parts produced from the mold. One embodiment of the inventive molding and assembly process utilizes a system with at least one family mold. As used herein, a family mold is a mold that forms separate, distinct parts that are to be joined together to form a single product. The family mold in this embodiment has alternating rows of mold cavities for two separate and distinct parts. Thus, the two separate distinct parts are molded side-by-side to one another in the family mold. After a molding cycle is complete, the two different parts are removed from the mold and transferred to a stacker so that the two separate parts have the same configuration as they did in the family mold and are side-by-side on the stacker. In this embodiment, an unloader can be used to remove the two parts from the family mold and can transfer the two parts to a linear transporter. The linear transporter can then transfer the two parts to the stacker.

After obtaining the two distinct parts from the linear transporter, the stacker can rotate into a position that is directly above a pallet. In this position, the stacker can place the first set of parts on the pallet. After the first set of parts are placed on the pallet, the stacker can move laterally so that the second set of parts are located above the first set of parts. The stacker can then place the second set of parts on top of the first set of parts. By placing the second set of parts on top of the first set of parts, the system creates a set of loosely assembly products.

The loosely assembly products can then be delivered to a welder. The welder will weld the two separate parts together to form a completed product. The completed products can then be transferred to and loaded in a magazine for storage. A pick and place unit with a plurality of vacuum grip heads can be utilized to transfer the completed products to the at least one magazine. Such a system and method can be utilized for a variety of products that require multiple pieces that need to be stacked on top of one another and welded together. For example, as explained in more detail below, this system and method can be utilized to create surgical suture packages with a bottom part and a top part.

BRIEF DESCRIPTION OF THE DRAWINGS

FIG. 3B shows a side perspective view of one of the molds that comprise the dual injection mold of FIG. 3A;

DETAILED DESCRIPTION OF THE INVENTION

Figure 1A:
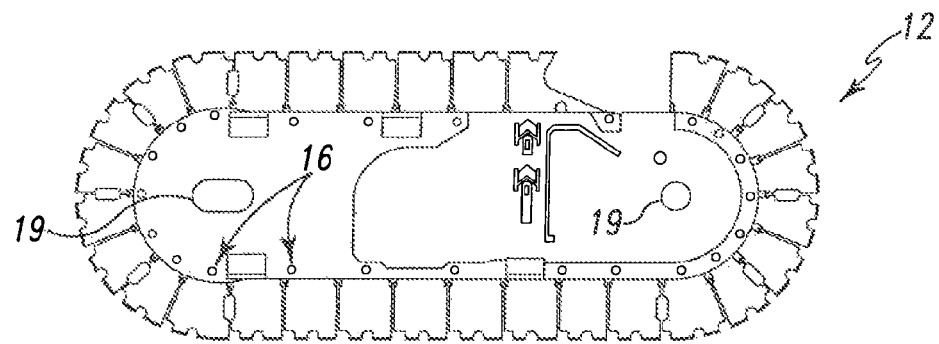
FIG. 1A shows a bottom view of a top part of an exemplary product created by the inventive molding and assembly process.
Figure 1B:
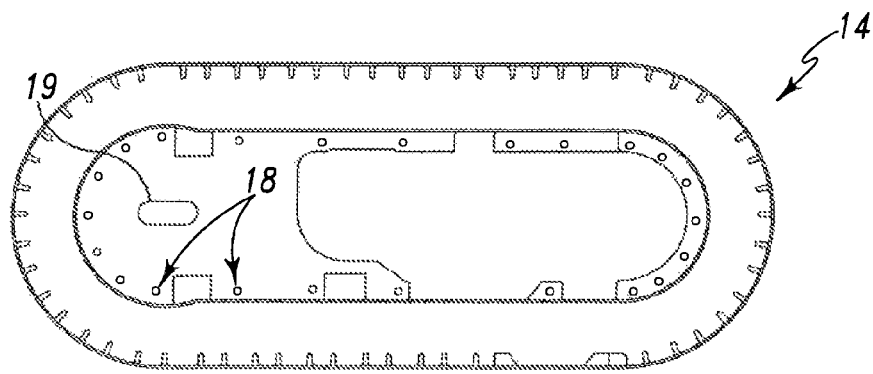
FIG. 1B shows a top view of a bottom part of the exemplary product manufactured by the inventive molding and assembly process.
Figure 1C:
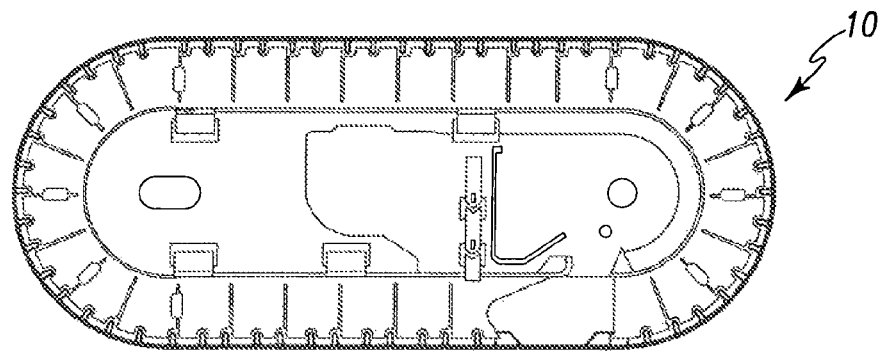
FIG. 1C shows the assembled exemplary product with the top part and bottom part joined together.

FIG. 1C shows an exemplary product created by the inventive molding and assembly process. As shown in FIGS. 1A-1C, the exemplary product is a two piece riveted package 10 for surgical sutures. The product includes a top part 12 (shown in FIG. 1A) with a plurality of rivet pins 16 and a bottom part 14 (shown in FIG. 1B) with a plurality of rivet holes 18. Top part 12 and bottom part 14 each also have at least one pilot hole 19. When top part 12 and bottom part 14 are joined together, plurality of rivet pins 16 extend from the top part through plurality of rivet holes 18 on the bottom part. A heating device welds rivet pins 16 so that the pins melt into rivet holes 18 and heat stake top part 12 to bottom part 14.

Figure 2:
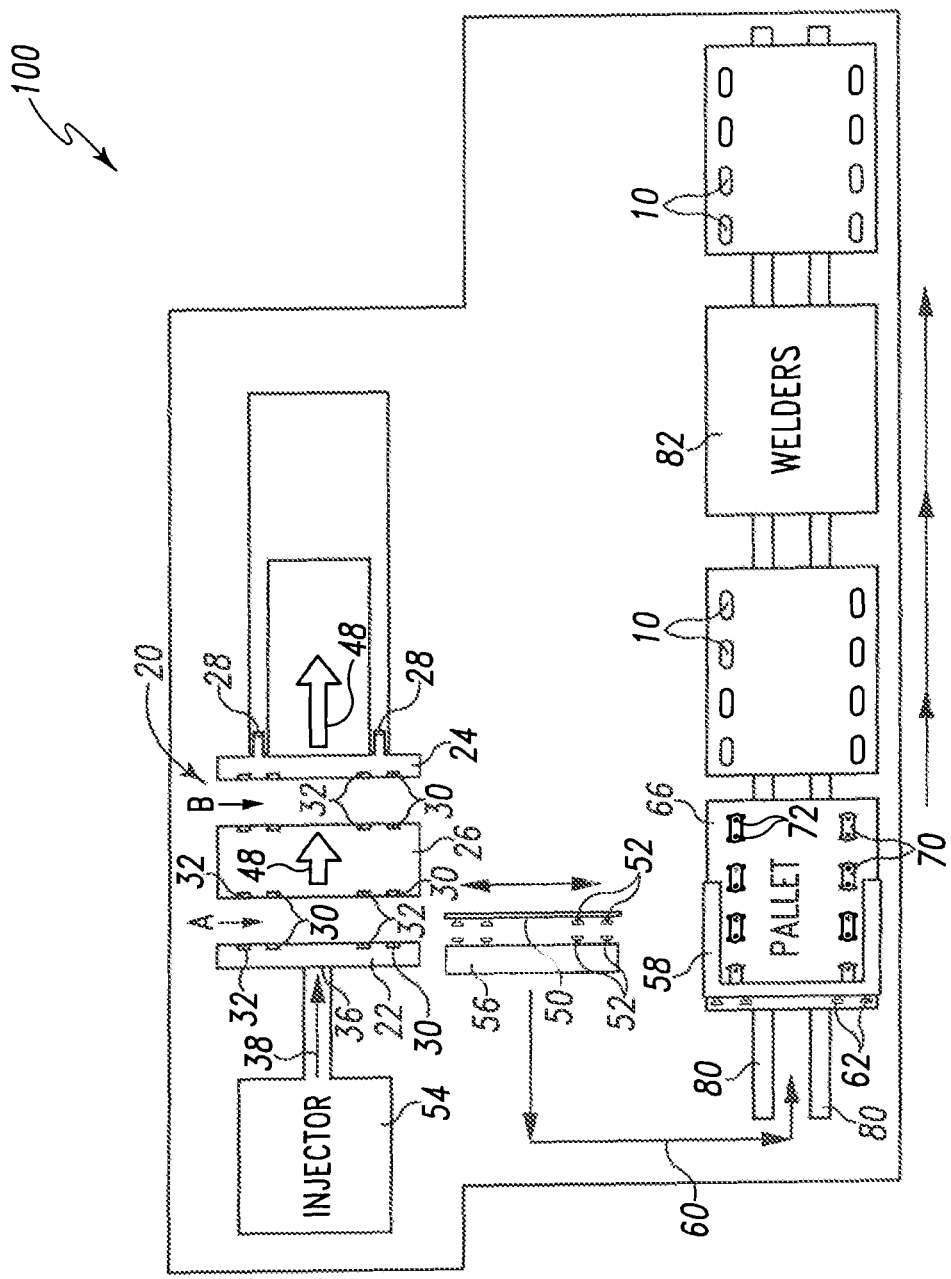
FIG. 2 shows a diagrammatic top view of a system with a dual injection mold and stacker used to produce the exemplary part of FIG. 1C.
Figure 3A:
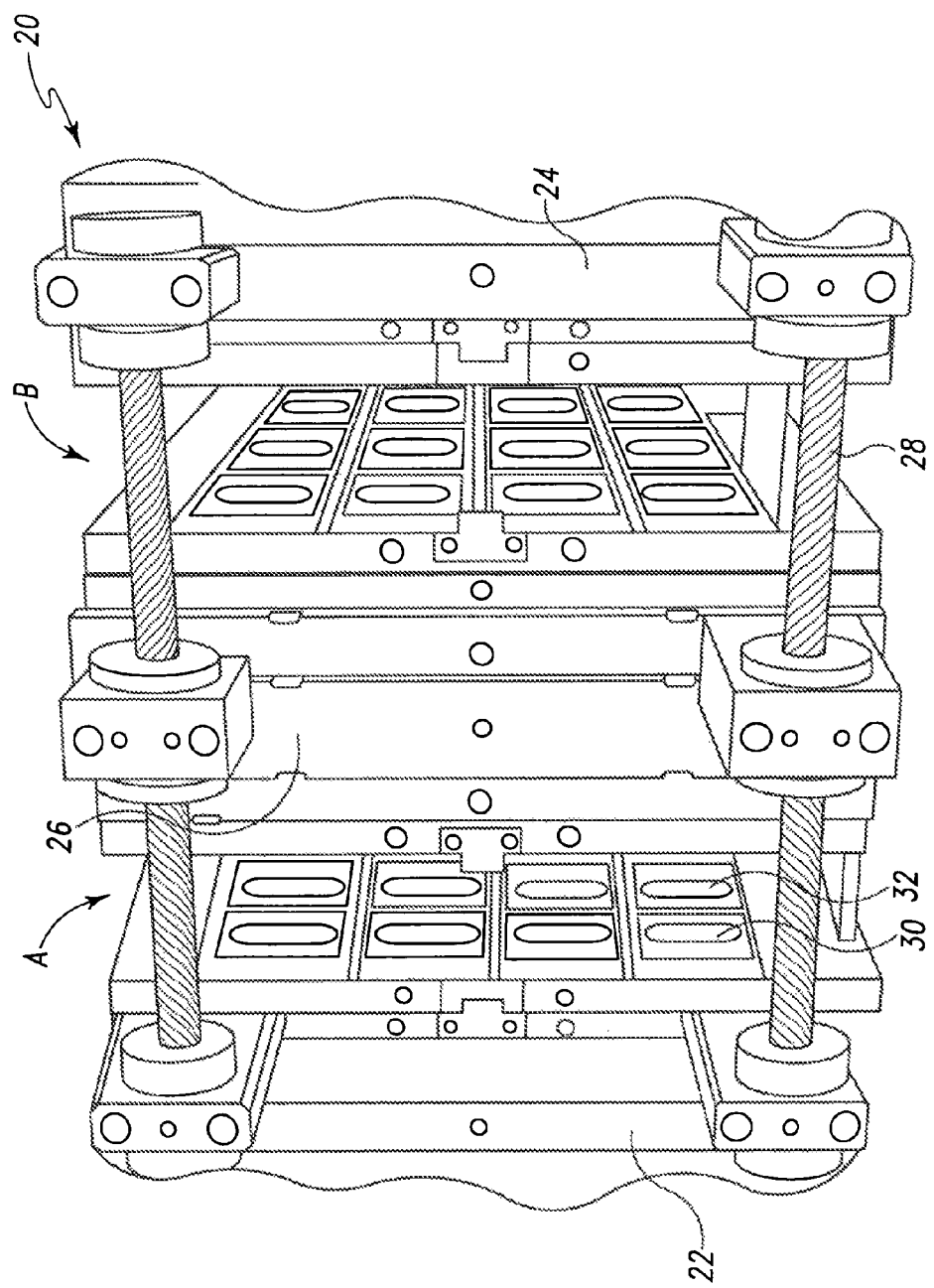
FIG. 3A shows a side perspective view of the dual injection mold of FIG. 2.

FIG. 2 shows a top diagrammatic view of an exemplary system 100 used to perform the molding and assembly process of the surgical suture packages. As shown in FIG. 2, system 100 comprises a dual injection mold 20. Dual injection mold 20 is a "stacked" mold consisting of two separate sets of molds A and B. Each of the molds A and B produce top parts 12 and bottom parts 14. FIG. 3a shows a side perspective view of molds A and B and FIG. 3b shows a close up perspective view of mold A. As shown in FIGS. 3a and 3b, molds A and B each contain a plurality of mold cavities 30 for top parts 12 and a plurality of mold cavities 32 for bottom parts 14, As can be seen in FIG. 3b, mold cavities 30 for top parts 12 and mold cavities 32 for top parts 14 are positioned side-by-side to one another so that each of the molds A and B have alternating, parallel columns of mold cavities 30 for the tops parts and mold cavities 32 for bottom parts.

Figure 4:
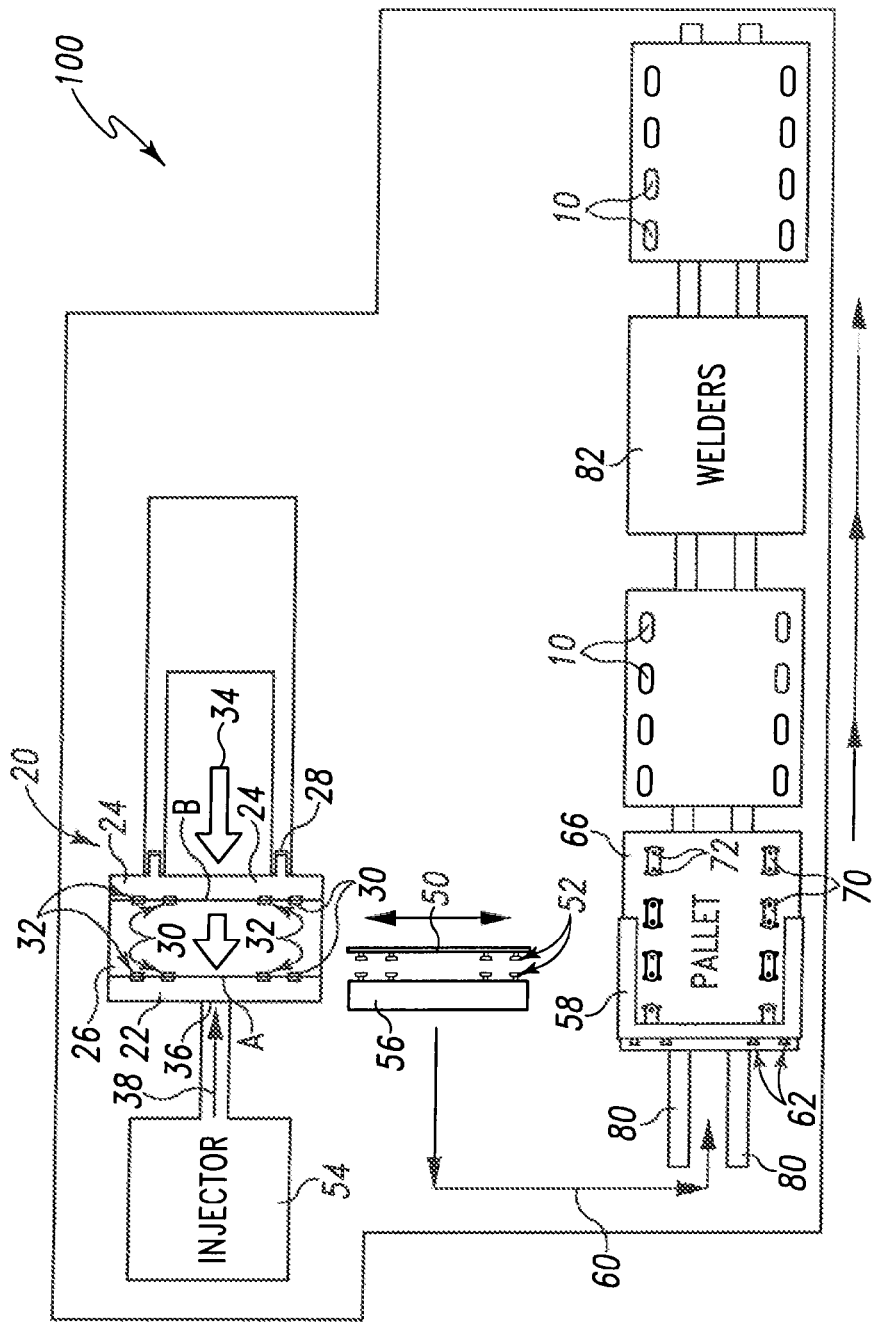
FIG. 4 shows a diagrammatic view of the system of FIG. 2 during the injection mold cycle.

Referring to FIGS. 2 and 3a, dual injection mold 20 comprises a stationary side 22, a moveable opposite side 24, and a moveable center 26. Two helical. screws 28 are positioned on each side of mold 20 and connect stationary side 22, moveable opposite side 24, and moveable center 26 to one another. FIG. 4 shows a diagrammatic top view of the system during a mold cycle. As shown in FIG. 4, an operating means (not shown), such as an electric motor or any other means well known in the art, causes helical screws 28 to advance so that opposite side 24 moves towards moveable center 26 in the direction of arrows 34 until it contacts the movable center. Movable center 26 also moves in the direction of arrows 34 until it comes into contact with stationary side 22. Dual injection mold 20 is collapsed such that the center 26 joins to both the stationary side 22 and the opposite side 24 to form mold cavities 30 for the top parts and mold cavities 32 for the bottom parts.

Figure 5:
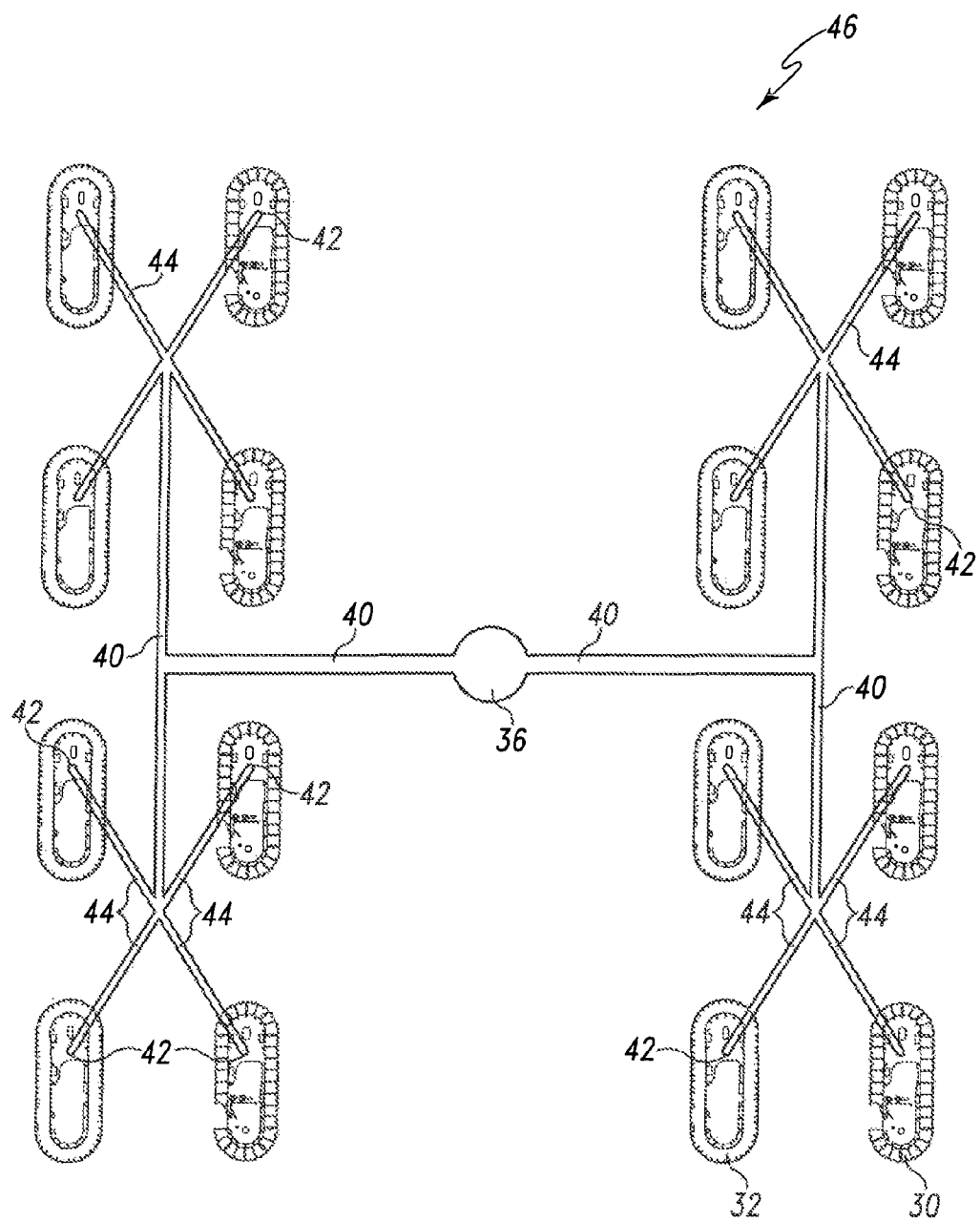
FIG. 5 shows a diagrammatic view of the manifold of the dual injection mold of FIG. 3A.

Once molds A and B are closed, an injector 54 pumps molten plastic (shown by arrow 38) through a center port 36. Center port 36 runs through both molds A and B in order to till the mold cavities 30 for the top parts and 32 for the bottom parts. Both molds A and B are family molds because each of the molds simultaneously mold separate, distinct parts that are to be joined together to form a single product. FIG. 5 shows the layout of each of the molds A and B. As shown in FIG. 5, molds A and B each comprise a manifold 46 with center port 36. A plurality of flow channels 40 branch off of centerport 36 and a plurality of runners 44 branch off of flow channels 40. At the end of each runner 44 is a gate 42 that connects the runner to either mold cavity 30 or mold cavity 32. Each gate 42 is associated with a pneumatic valve that opens and closes the gate. Manifold assembly 46 allows molten plastic to pass center port 36, through flow channels 40, through runners 44, through gates 42, and into each of mold cavities 30 and 32. Gates 42 are electronically controlled and are selectively opened at different times during the mold cycle in order to control the timing of the molten plastic entering each mold cavity, and thus ensuring that each part has a similar density as other parts in the mold. This process of opening and closing the gates to the mold at different times is often referred to as "sequential injection" molding. Once the mold cycle is completed and top parts 12 and top parts 14 are molded, each runner 44 is pinched off at each gate 42 by the pneumatic valve associated with the gate. In this embodiment, each mold A and B produce 16 parts during a mold cycle (8 bottom parts and 8 top parts). However, it is possible to create molds with more or less mold cavities in order to produce more or less parts.

Figure 6:
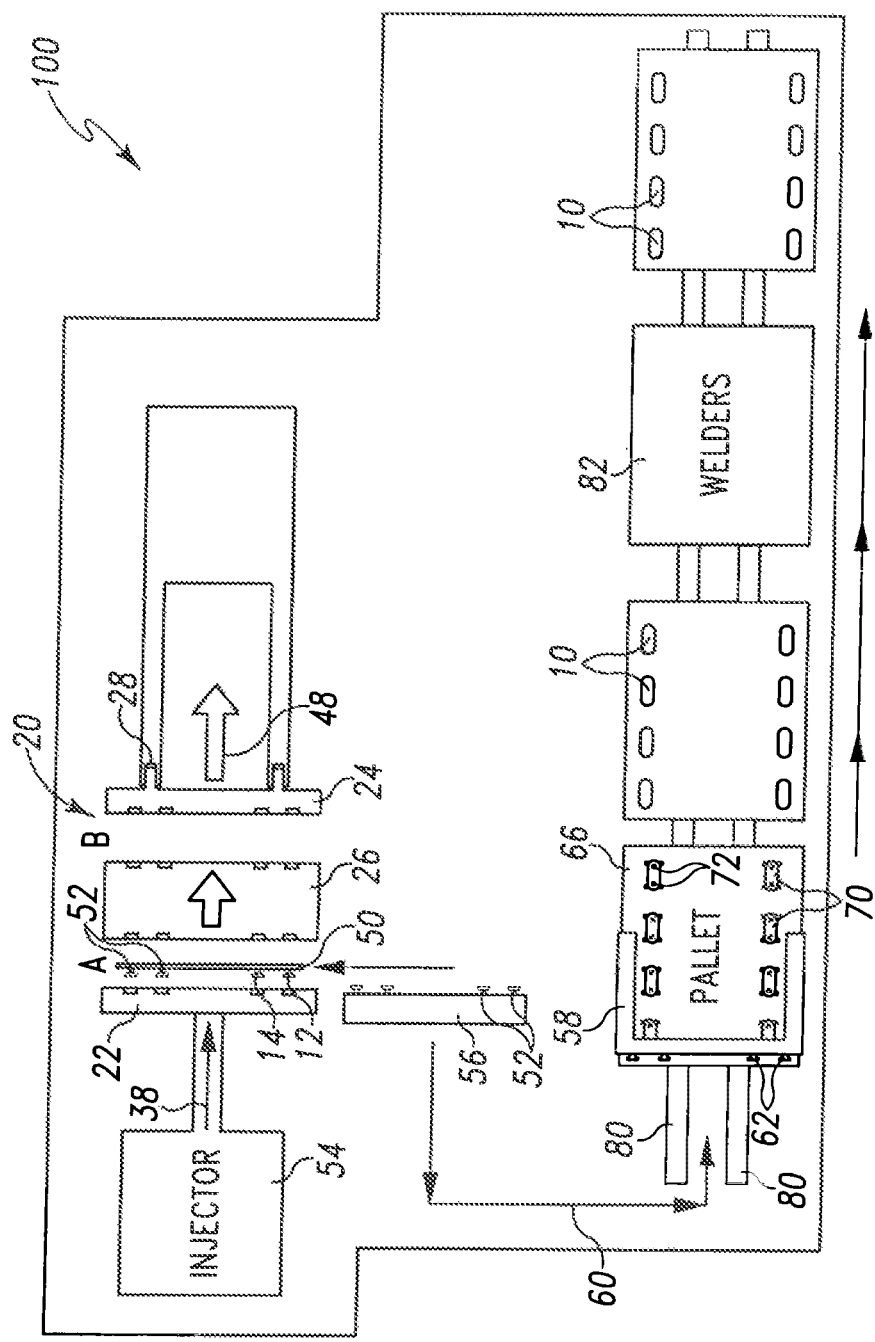
FIG. 6 shows a diagrammatic view of the system of FIG. 2 during the unloading cycle.

After a mold cycle is complete, molds A and B open and molded top parts 12 and bottom parts 14 are removed from mold cavities 30 and 32. FIG. 6 shows a diagrammatic top view of system 100 during the unloading process. As shown in FIG. 6, helical screws 28 retreat in the direction of arrows 48 so that movable center 26 and opposite side 24 move away from stationary side 22. Helical screws 28 ensure equal spacing of molds A and B when the molds are completely open. Once molds A and B are open, an unloader 50 is inserted between stationary side 22 and movable center 26 of mold A. Unloader 50 includes a plurality of vacuum grippers 52. Vacuum grippers 52 contact molded top parts 12 and bottom parts 14 and form a vacuum between the grippers and the top parts and bottom parts. In this manner, vacuum grippers 52 secure these molded parts to unloader 50 in the same arrangement as they were molded in mold A (i.e., top parts 12 and bottom parts 14 are placed in four alternating, parallel columns so that each of the top parts is positioned next to one of the bottom parts). While only the removal of top parts 12 and bottom parts 14 from mold A is shown, the removal of the top parts and bottom parts from mold B will be accomplished with an essentially identical process. The number and location of vacuum grippers 52 on unloader 50 corresponds to the number and location of parts produced by mold A. Thus, in this embodiment, unloader 50 can remove and unload all 16 parts from mold A at one time.

Figure 7:
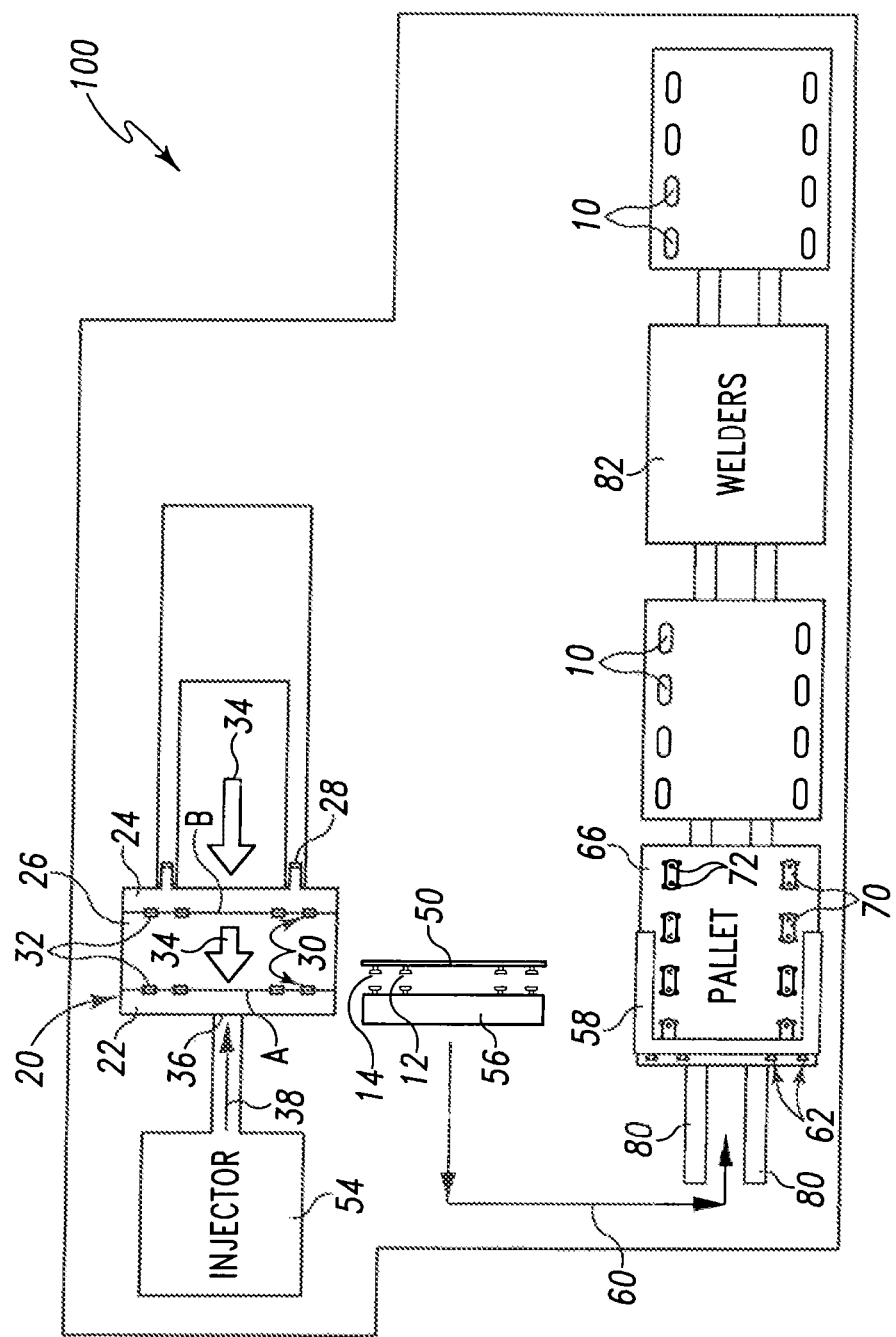
FIG. 7 shows a diagrammatic view of the system of FIG. 2 during the transfer of the top parts and bottom parts to the stacker.

FIG. 7 shows a diagrammatic top view of system 100 during the transferring process of top parts 12 and bottom parts 14 from unloader 50 to a linear transporter 56 and from the linear transporter 56 to a stacker 58. As shown in FIG. 7, unloader 50 is removed from mold 20 and interfaces with linear transporter 56 so that the linear transporter receives top parts 12 and bottom parts 14 from the unloader. Linear transporter 56 also has vacuum grippers 52 that correspond in number and location to the vacuum grippers located on unloader 50. Linear transporter's 56 vacuum grippers 52 contact and form a vacuum on top pails 12 and bottom parts 14 of unloader 50, while the vacuum is removed from unloader's 50 vacuum grippers in order to release the top parts and bottom parts. The parts are arranged on linear transporter 56 just as they were molded within molds A and B (i.e., top parts 12 and bottom parts 14 are placed in four alternating, parallel columns so that each of the top parts is positioned next to one of the bottom parts). During the time that unloader 50 places the parts on linear transporter 56, dual mold 20 collapses and molten plastic 38 is again delivered to the molds A and B and the molding process begins again.

Figure 8:
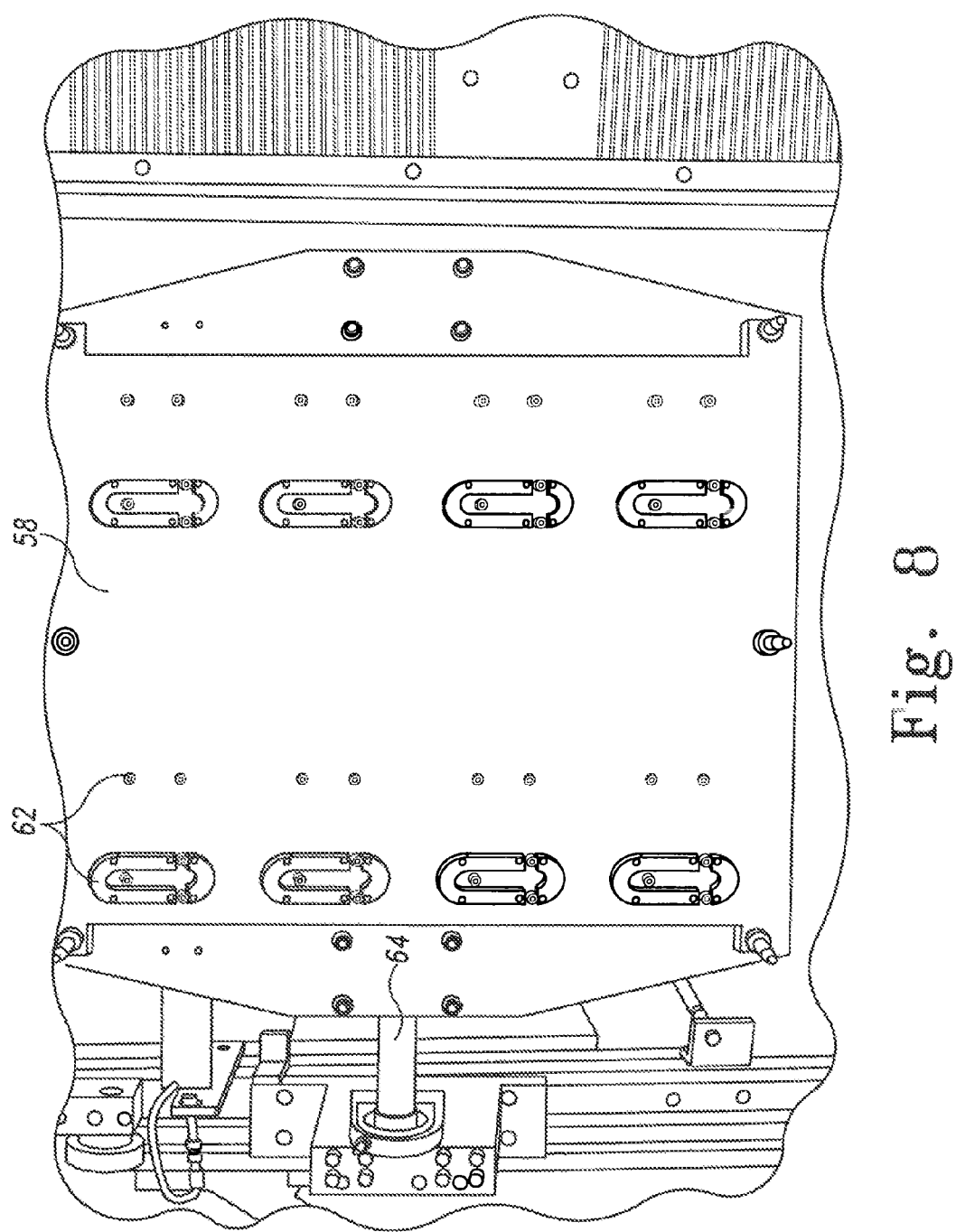
FIG. 8 shows a front view of the stacker of FIGS. 2, 4 and 7.
Figure 9:
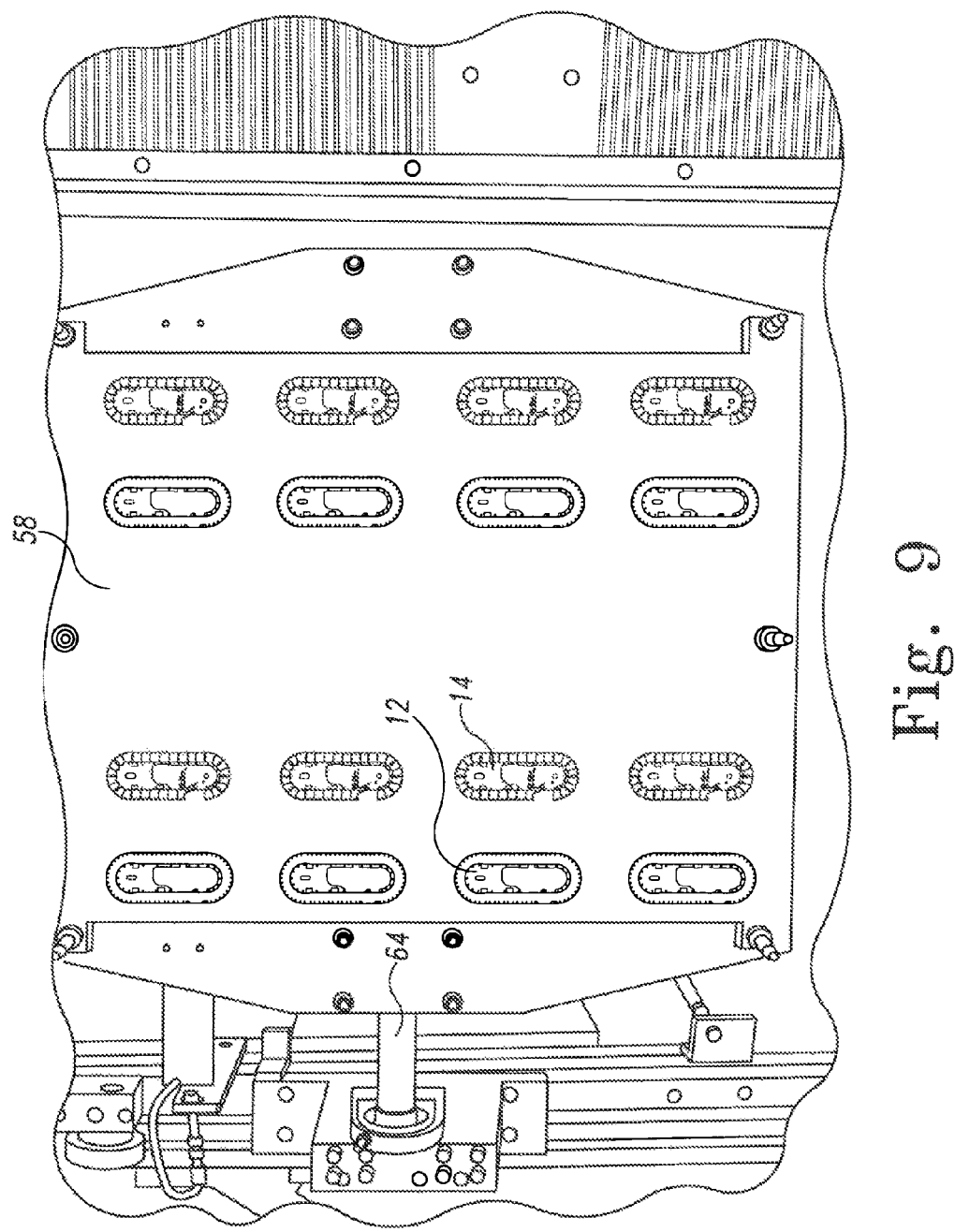
FIG. 9 shows the stacker of FIG. 8 after the top parts and bottom parts have been transferred to the stacker.

Still referring to FIG. 7, linear transporter 56 moves along a path 60 and delivers top parts 12 and bottom parts 14 to stacker 58. FIG. 8 shows a front view of stacker 58. As shown in FIG. 8, stacker 58 includes a plurality of vacuum cups 62 for holding top parts 12 and bottom parts 14. Referring back to FIG. 7, linear transporter 56 moves along path 60 until top parts 12 and bottom parts 14 come into contact with vacuum cups 62, When stacker 58 receives parts from the linear transporter, it is in a vertical position. Vacuum cups 62 form a vacuum on top parts 12 and bottom parts 14 while the vacuum from the vacuum grippers 52 of linear transporter 56 is removed to release the top parts and bottom parts. Vacuum cups 62 are arranged on stacker 58 so that top parts 12 and bottom parts 14 are held on the stacker in the same pattern as the parts are held on linear transporter 56, 9 shows stacker 58 after top parts 12 and bottom parts 14 are transferred to stacker 58 from linear transporter 56. As shown in FIG. 9, top parts 12 and bottom parts 14 are positioned in four alternating, parallel columns of top parts and bottom parts, so that each top part is positioned next to one of the bottom parts.

Figure 10:
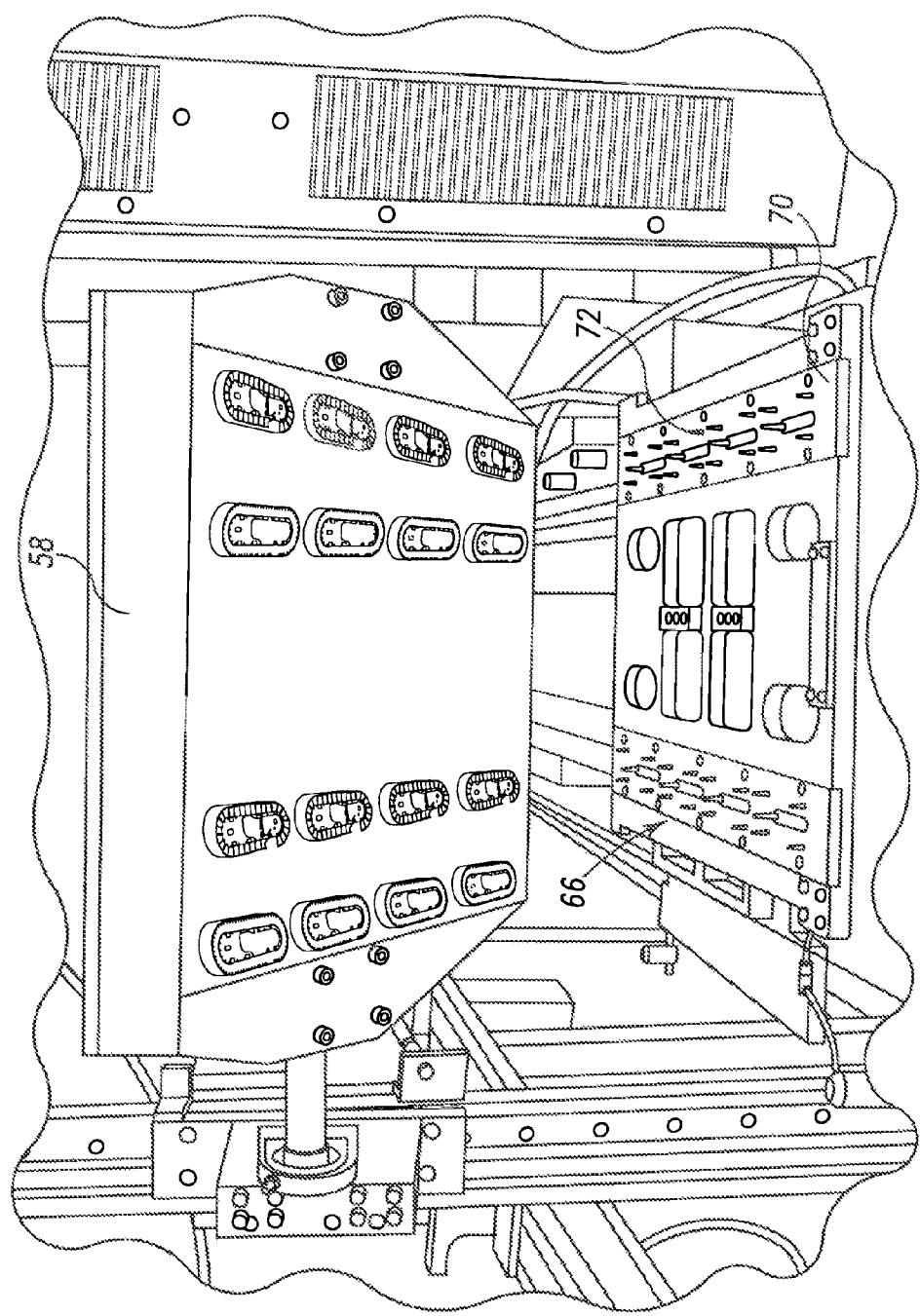
FIG. 10 shows the stacker of FIG. 9 being rotated so that it can interact with a pallet.
Figure 11:
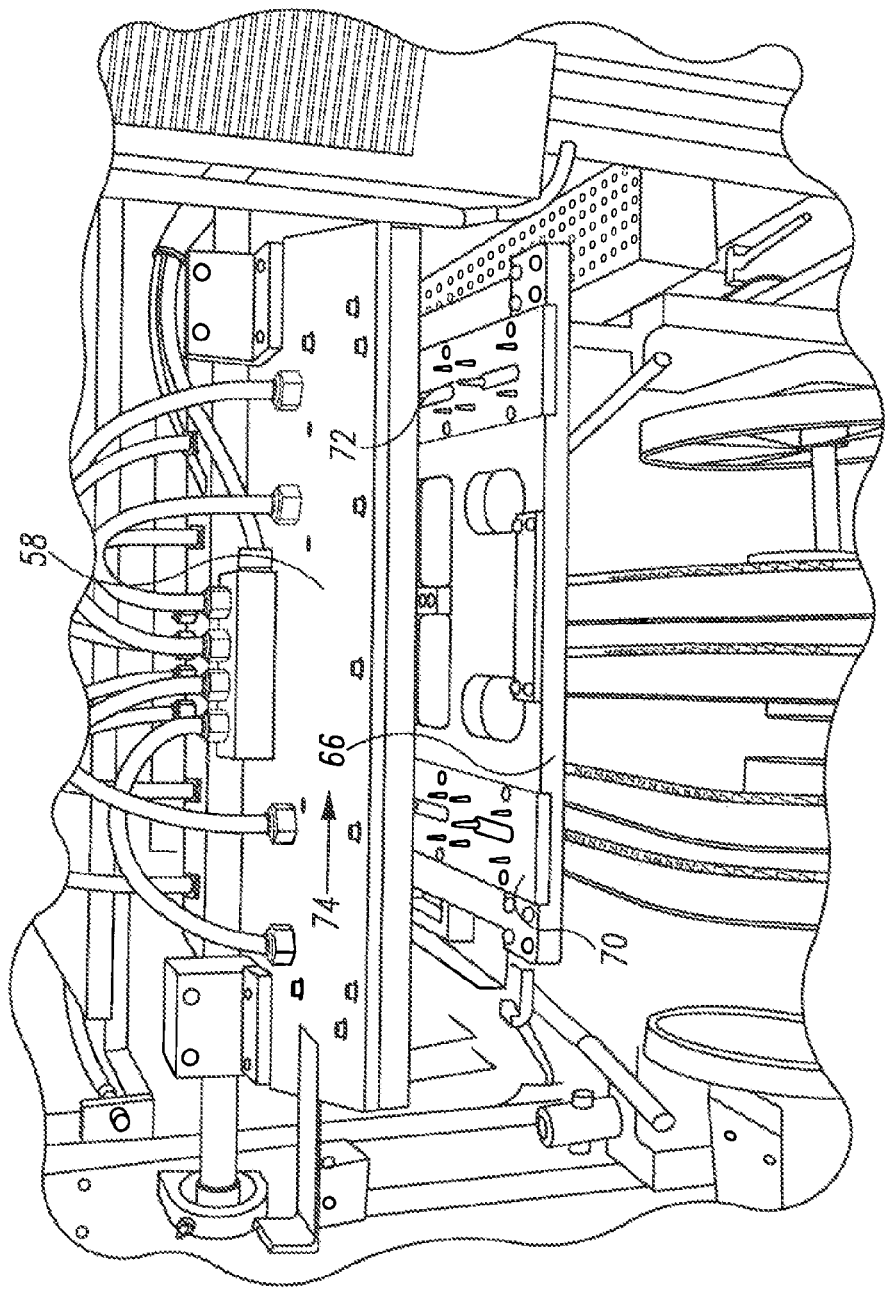
FIG. 11 shows the stacker of FIG. 9 positioned directly above the pallet.

Still referring to FIG. 9, stacker 58 is positioned on a shaft 64 that can be rotated 360 degrees in both the clockwise and counterclockwise direction by an electrical motor or a variety of other means well known in the art. After receiving top parts 12 and bottom parts 14 from linear transporter 56, shaft 64 and stacker 58 rotate 90 degrees, so that the stacker is in a horizontal position and interacts with pallet 66. FIG. 10 shows shaft 64 and stacker 58 being rotated so that the stacker can interact with pallet 66. As shown in FIGS. 7 and 10, pallet 66 includes two distinct rows of assembly nests 70. Each assembly nest 70 contains tapered pilot pins 72 that are designed for insertion into pilot holes 19 of top parts 12 and bottom parts 14. Pilot pins 72 also contact the edges of the top parts and bottom parts. In this manner, pilot pins 72 interacts with top parts 12 and bottom parts 14 in order to align the top parts with the bottom parts. FIG. 11 shows stacker 58 positioned directly above pallet 66. As shown in FIG. 11, stacker 58 rotates until it is positioned directly above pallet 66 in a horizontal position and top parts 12 are directly over assembly nests 70. Once stacker 58 is in this position, it releases top parts 12, so that each top part falls from the stacker and is received in one of assembly nests 70 of pallet 66. As top parts 12 are released, pilot pins 72 engage the edges of top part 12 and are inserted into pilot holes 19 of the top part. In this manner, pilot pins 72 ensure that the top part is accurately positioned.

Still referring to FIG. 11, stacker 58, next, shifts in the direction of arrow 74 so that bottom parts 14 are positioned directly over assembly nests 70 and top parts 12. Stacker 58 then releases bottom parts 14 so that each bottom part falls from stacker and is received in one of assembly nests 70 of pallet 66. In each assembly nest 70, pilot pins 72 engage the edges of bottom part 14 and pass through pilot hole 19 to ensure that the bottom part is accurately positioned on top of top part 12, so that the top parts' rivet pins 16 extend through the bottom part's rivet holes 18 and are exposed upwards. In this manner, top parts 12 and bottom parts 14 are loosely assembled into packages 10 of surgical sutures.

Referring back to FIG. 7, once packages 10 are loosely assembled, pallet 66 proceeds along conveyor belt 80 and passes under ultrasonic welders 82. After pallet 66 proceeds to ultrasonic welders 82, shaft 64 and stacker 58 rotate back to their original position so that the stacker can receive the next load of top parts 12 and bottom parts 14 and another pallet 66 is put in, position. Stacker 58 then repeats the above-described process to loosely assembly packages 10 on the new pallet.

Figure 12:
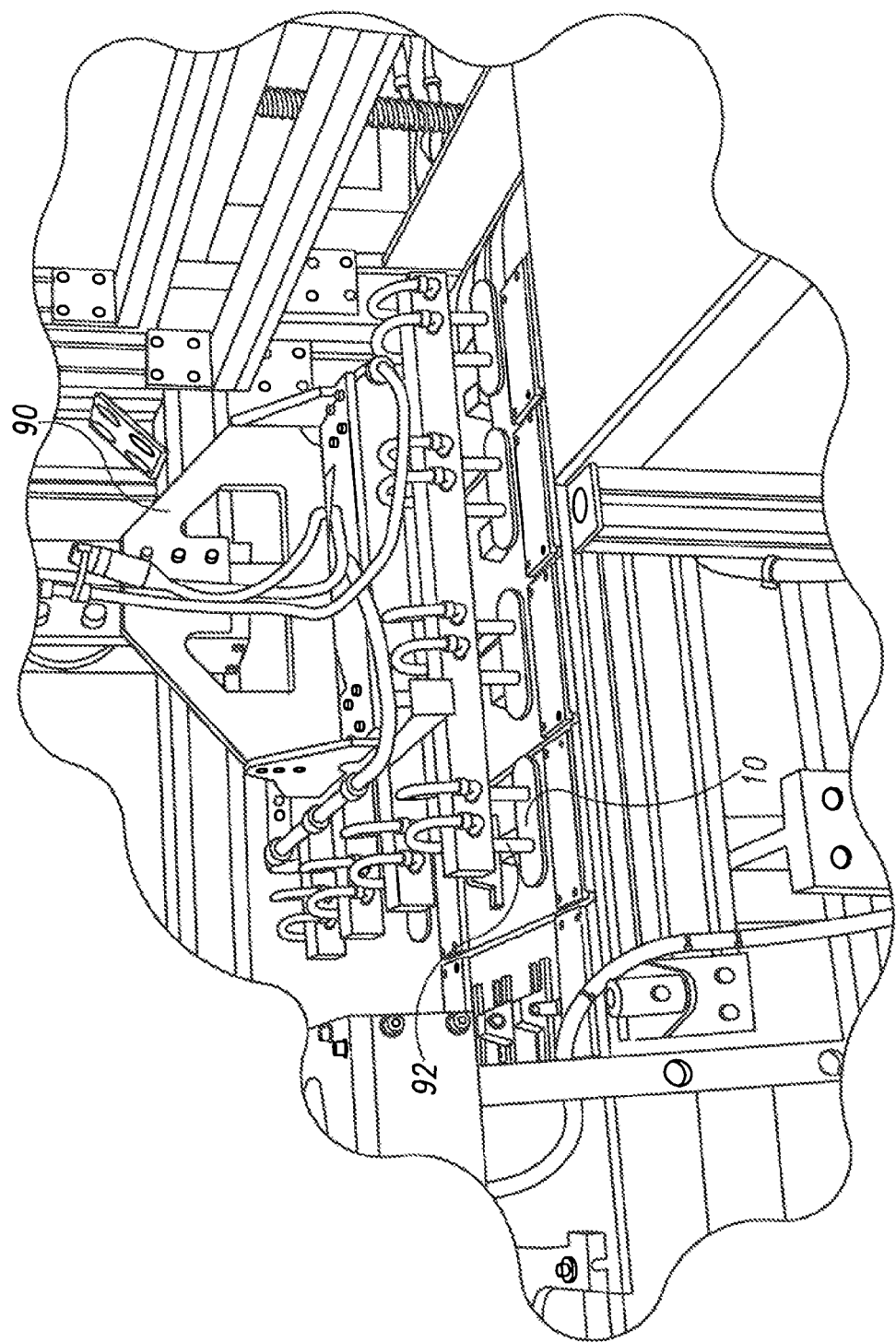
FIG. 12 shows a pick and place unit removing fully assembled products from the pallet.
Figure 13:
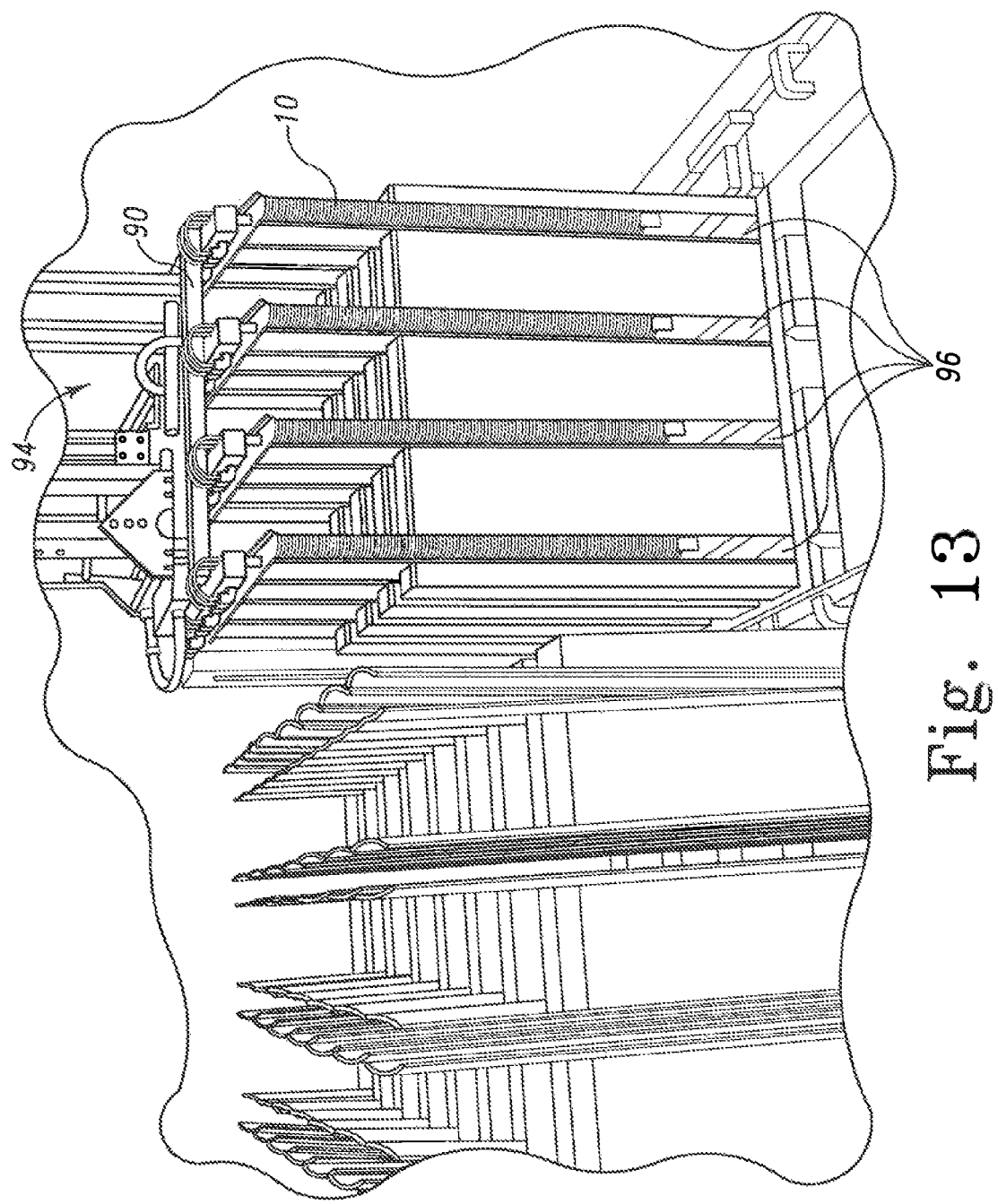
FIG. 13 shows the completed products being delivered to a magazine for storage and shippage.

Still referring to FIG. 7, pallet 66 travels down the conveyor belt 80 until it comes to a position below ultrasonic welders 82. Ultrasonic welders 82 descend over loosely assembled packages 10 with their horns bearing on protruding rivet pins 16. In this manner, ultrasonic welders 82 melt rivet pins 16 down into rivet holes 18 and heat stake the bottom part 14 to the top part 12. Pallet 66 then moves past ultrasonic welders 82 along conveyer belt 80 into a position that allows assembled packages 10 to be removed from pallet 66 and stacked in a magazine for storage and subsequent shipping, FIG. 12 shows a pick and place unit 90 removing fully assembled packages 10 from pallet 66. As shown in FIG. 12, pick and place unit 90 has a plurality of vacuum grip heads 92 that contact and form a vacuum on each of the packages 10. Pick and place unit 90 then removes each package 10 from each assembly nest 70 at the same time. FIG. 13 shows pick and place unit 90 delivering completed packages 10 to magazine 94. As shown in FIG. 13, each magazine 94 has four slots 96 that are each dimensioned to receive four completed packages 10 at the same time, Also shown by FIG. 13, pick and place unit 90 has enough vacuum heads 92 to place four rows of four packages (total of 16) in magazine 94, Pick and place unit 90 loads packages 10 into each of magazine's 94 slots 96 by releasing its vacuum grip on packages 10. Pick and place unit 90 repeats this process of transferring the packages 10 from pallet 66 and depositing the completed packages on top of each other in the magazine's slots 96 (visible suture package stacks are shown in FIG. 13) until the magazine 94 is filled.

While a particular embodiment of the subject invention has been described in considerable detail herein, such is offered by way of a non-limiting example of the invention as many other versions are possible. For example, molds A and 13, unloader 50, linear transporter 56 and stacker 58 can be constructed to mold, produce, hold and transport any number of molded parts. Further, packages of surgical sutures do not have to be the product molded and assembled using this process. Rather, any product or package that requires any number of separate molded parts to be molded, stacked and assembled to one another can be manufactured by this process, Moreover, pallet 66 and pick and place unit 90 can be constructed to hold and transport any number of assembled products. It will also be appreciated by one skilled in the art that pallet 66 could be laterally shifted instead of stacker 58 in order to loosely assembly the top part 12 and bottom part 14 into a package 10. It is anticipated that a variety of other modifications and changes will be apparent to those having ordinary skill in the art and that such modifications and changes are intended to be encompassed within the spirit and scope of the appended claims.

We claim:

1. A method of assembling multi-piece parts to form a product, the method comprising the steps of:
    (a) providing a plurality of top parts and a plurality of bottom parts side-by-side on a stacker;
    (b) positioning a pallet adjacent to the stacker;
    (c) rotating the stacker so that the stacker and the top parts and bottom parts are located above the pallet;
    (d) placing each of the top parts onto the pallet;
    (e) laterally shifting the stacker;
    (f) placing each of the bottom parts on top of the top parts to form a plurality of loosely assembled parts disposed on the pallet; and
    (g) joining the plurality of loosely assembled parts to form products.

2. The method of claim 1, further comprising the step of molding the top parts and bottom parts in a family mold.

3. The method of claim 2, wherein the top parts have a plurality of rivet pins on each of their surfaces and the bottom parts have a plurality of rivet holes and wherein the step of placing each bottom part on top of each top part further comprises inserting the rivet pins into the rivet holes.

4. The method of claim 3, further comprises the step of melting the rivet pins with at least one welder so that each top part and bottom part are heat stacked to one another to form completed products.

5. The method of claim 4, further comprising the step of transferring the completed products to a magazine and loading the completed products in the magazine.

6. The method of claim 5, wherein at least one pick and place unit with a plurality of vacuum gripers is utilized to transfer the completed products to the magazine.

7. The method of claim 6, wherein at least one unloader and at least one linear transporter are utilized to transfer the top parts and bottom parts to the magazine.

8. A system for molding and assembling multi-piece parts to form a product comprising:
   (a) at least one family mold that molds a first plurality of parts and a second plurality of parts positioned side-by-side to one another;
   (b) at least one stacker that rotates and moves laterally with a plurality of vacuum gripers that can interact with the first and second plurality of parts in the side-by-side orientation;
   (c) at least one pallet arranged and positioned adjacent to the at least one stacker so that when the stacker rotates, the stacker will be directly above the pallet so that the first plurality of parts can be placed on the pallet and when the stacker moves laterally the second plurality of parts can be placed on the first plurality of parts on the pallet to form a plurality of loosely assembled parts disposed on the pallet; and
   (d) at least one device for joining the first and second plurality of parts to form products.

9. The system of claim 8, further comprising at least one moveable unloader that interacts with the family mold to remove the first and second plurality of parts.

10. The system of claim 9, further comprising at least one moveable linear transporter that can interact with the unloader to obtain the first and second plurality of parts and transfer the first and second plurality of parts to the stacker.

11. The system of claim 10, further comprising a conveyor belt that interacts and transports the pallet.

12. The system of claim 11, wherein the at least one device for joining the parts is at least one welder that can weld each of the first plurality of parts to the second plurality of parts to create completed products.

13. The system of claim 12, further comprising a pick and place unit that can remove the completed products from the pallet.

14. The system of claim 13, further comprising a magazine that can hold and store the completed products for shipping.

15. The system of claim 8, wherein the pallet comprises a plurality of assembly nests each with at least one pilot pin that properly aligns the first plurality of parts with the second plurality of parts.

* * * * *